United States Patent [19]

Cordi et al.

[11] 4,020,466
[45] Apr. 26, 1977

[54] MEMORY HIERARCHY SYSTEM WITH JOURNALING AND COPY BACK

[75] Inventors: Vincent Anthony Cordi, Vestal; Bruce Adam Edson, Apalachin, both of N.Y.

[73] Assignee: IBM Corporation, Armonk, N.Y.

[22] Filed: July 5, 1974

[21] Appl. No.: 486,043

[52] U.S. Cl. ............................................. 340/172.5
[51] Int. Cl.² .................................................. G06F 13/00
[58] Field of Search .................... 340/172.5; 445/1

[56] References Cited
UNITED STATES PATENTS

| | | | |
|---|---|---|---|
| 3,710,349 | 1/1973 | Miwa et al. | 340/172.5 |
| 3,737,866 | 6/1973 | Gruner | 340/172.5 |
| 3,760,364 | 9/1973 | Yamauchi et al. | 340/172.5 |
| 3,806,888 | 4/1974 | Brickman et al. | 340/172.5 |
| 3,810,110 | 5/1974 | Kotok et al. | 340/172.5 |

*Primary Examiner*—Gareth D. Shaw
*Assistant Examiner*—John P. Vandenburg
*Attorney, Agent, or Firm*—James E. Murray

[57] ABSTRACT

This hierarchical memory system has two memory units on each level. One of the units called the data store contains all the data at that level of the memory. The other unit called the copy back store contains all the changes that have been made in that data either by addition or modification. While the data store is interfaced with the next higher level in the hierarchical memory system or with the processing units for the data processing system, the second or copy back store can transfer the changes made in the data into the next lower level in the memory hierarchy system if the copy back store is free and the data store in the next lower level is not involved in transferring data up the hierarchy. The data store and the copy back data store in each level are on two different power systems and transfers of the changes to the next lower level are done in the order in which the change entered in the copy back store with the oldest entry being the first to be copied back.

6 Claims, 7 Drawing Figures

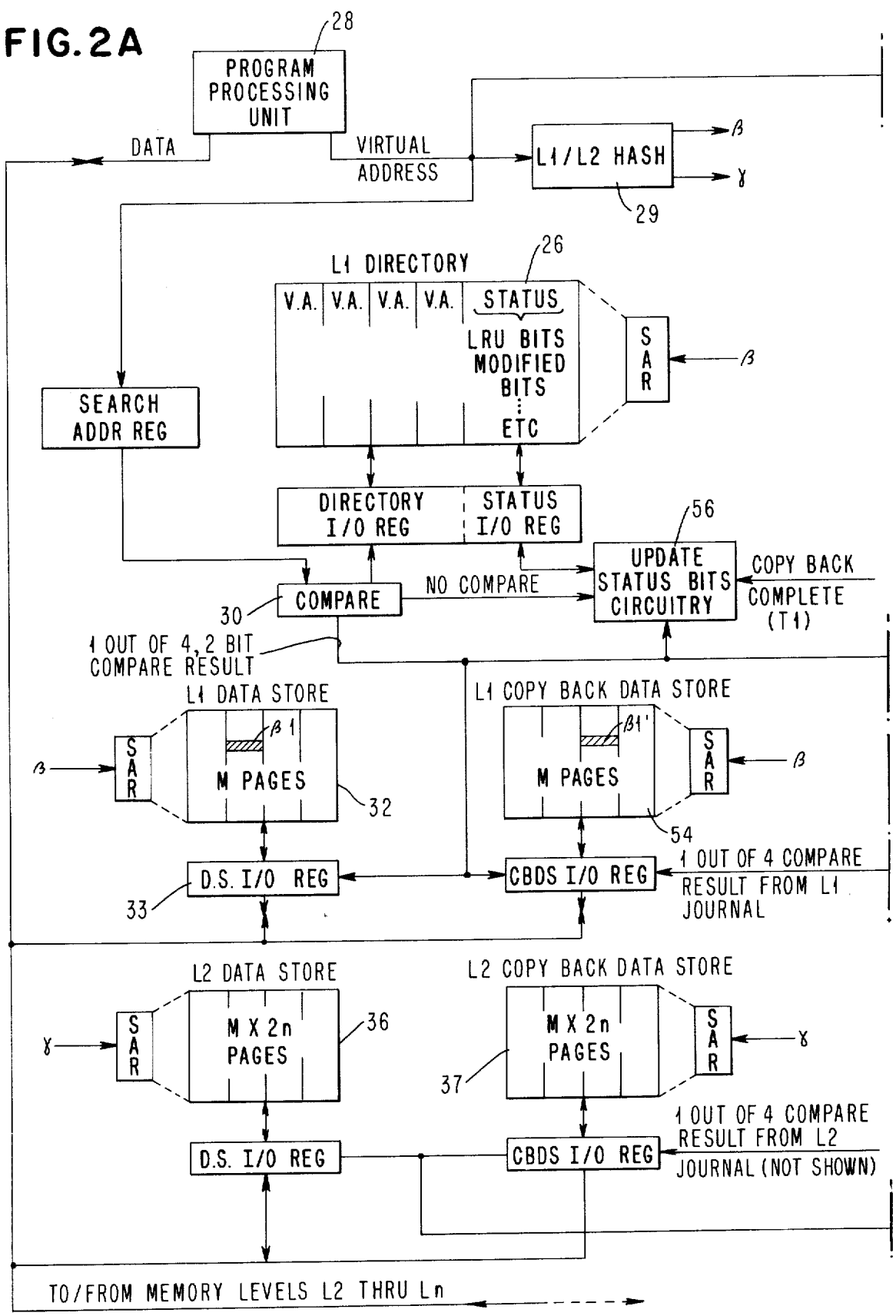

MEMORY HIERARCHY SYSTEM WITH JOURNALING AND COPY BACK

BACKGROUND OF THE INVENTION

The present invention relates to memories and more particularly to hierarchical memories.

Hierarchical memories using monolithic storage elements at the higher levels have resulted in faster and more economical memory systems as described in the Brickman et al U.S. Pat. No. 3,806,888. However, such memories are not without drawbacks. In particular, hierarchical systems have significant communication problems between the levels of the hierarchy and the volatile monolithic memories in the higher levels of the hierarchy have data integrity problems resulting from their reliability and their susceptibility to power supply failures and fluctuations. One solution to the integrity problem would be to have two storage units at each level, each with a duplicate of the data at the level so that if a failure occurred in one store, the data could be reproduced from the other. However, while this improves reliability it does nothing to alleviate the communication problem between the levels and, furthermore, in case of a failure requiring or forcing a shut down of the memory the transfer of the duplicated data from the levels of the memory containing the volatile memories to levels containing non-volatile memories in the process of bringing the storage system down would require much more time than is desirable and in fact may be available before the failure results in the destruction of data.

BRIEF DESCRIPTION OF THE INVENTION

In accordance with the present invention, data integrity is obtained using new copy back techniques and the communication problem has been simplified by using a new copyback algorithm in combination with the new copyback techniques. The new hierarchical memory system has two memory units on each level. One of the units contains all the data at that level of the memory. The other unit contains only the changes that have been made in that data either by addition or modification. While the first or data storage unit is interfaced with the next higher level in the hierarchical memory system or with the processing units for the data processing system, the second or copy back storage unit can transfer the changes made in the data into the next lower level in the memory hierarchy system if the copy back store is free and the main memory unit in the next lower level is not involved in the transferring of data up the line. By duplicating only the changed data and copying back the changes to the data at lower levels when the opportunity presents itself, the amount of data that must be moved at the occurrance of a failure is minimized thereby reducing the time required to move the data on failure. Furthermore, the data store and the copy back data store in each level are on two different power systems so that if either power system goes out a complete record of the data is maintained.

The algorithm used to transfer the changes in data back down the levels in the hierarchy is called the least recently first modified copyback algorithm. What is meant by this is that the copying back of data at any level is done to the units of data in the order in which the units of data first received a change that has not been copied back to a lower level in the hierarchy. Or, in other words, copying back is done on the basis of order in which the entry was made in the copy back store with the oldest entry generally being the first to be copied back. By using this algorithm the amount of data movement in copying back is minimized.

Therefore, it is an object of the present invention to provide a new hierarchical memory system.

It is another object of the present invention to provide a hierarchical memory system in which data integrity is maintained but which does not involve the complications of straight duplication.

Another object is to provide a hierarchical system that insures data integrity by employing copy back and journaling techniques.

Another aspect of the invention is to provide a new technique for transferring changes in the data down through a hierarchical memory system.

The foregoing and other objects, features and advantages of the present invention will be apparent from the follownng description of a preferred embodiment of the invention as illustrated in the accompanying drawings, of which:

DESCRIPTION OF THE DRAWINGS

FIGS. 2A and 2B are a block diagram showng details of two levels of the memory hierarchy system shown in FIG. 1;

DETAILED DESCRIPTION OF THE INVENTION

Figure 1:
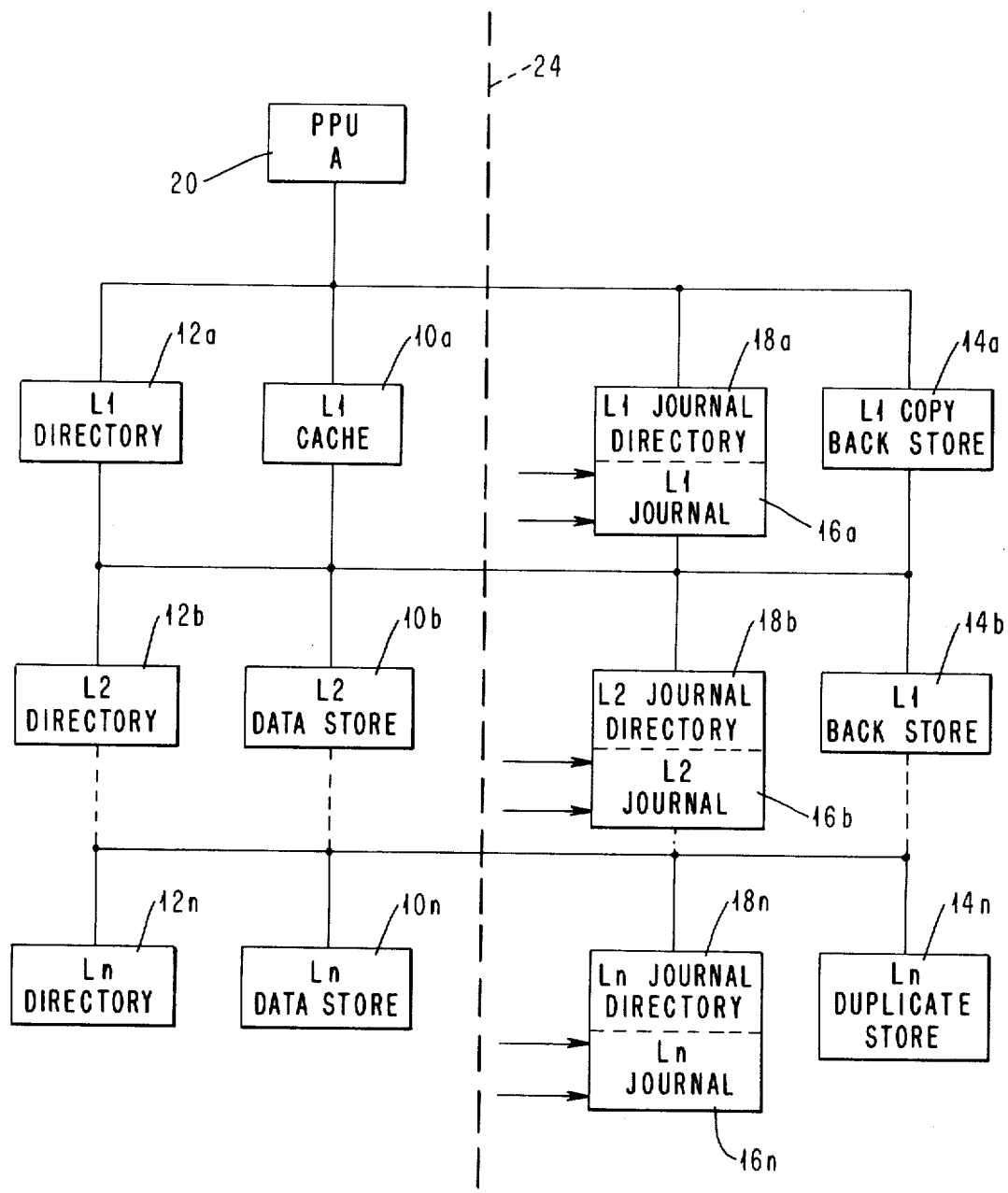
FIG. 1 is a generalized schematic diagram of a hierarchical system employing the present invention.

Referring now to FIG. 1, each level of the memory hierarchy consists of a data store 10 which can be accessed to obtain or enter data at that level, a directory 12 for that data store 10 listing the data at that level of the hierarchy a copy back data store 14 containing all the changes made in the data at that level that have not been made in the data at lower levels in the hierarchy, a journal 16 for maintaining the order in which changes were entered into the copyback store, and a journal directory 18 indicating whether data at any particular level in the data store 10 had been changed previously.

When data is requested by a processor unit 20 the data store directory 12a at the highest level L1 is checked to determine if the data is at that level. If it is, the data is fetched from the data store 10a. If the data is not at the top level, the directory 10b at the next lower level L2 is checked to see if the data is at that level and so on until the data is found or the lowest level is reached. When the data is found it is moved up the hierarchy into the highest level L1 where it can be accessed by PPU 20 from the data store 10a at that level. Hierarchical memory systems are well known in the prior art as are the algorithms for transferring and replacement of data in response to the request for data by PPU. This can be seen in the aforementioned Brickman et al U.S. Pat. No. 3,806,888. Since obtaining of data in request of PPU 20 is not an immediate concern with respect to the present invention, no detailed discussion of these transfer algorithms is included in the present application except insofar as they do affect the present invention.

When data is to be written into the memory by PPU 20 it is recorded both in the data store 10a and in the copyback data store 14a on the first level L1. At the same time, the journal directory 18a is interrogated to see if the data had been previously modified. If not, an entry is made into the journal 16 at the next free space in the journal 16. Entry into the journal 16 is made in order of addressing sequence of the journal with the first entry going into the first space in the sequence, the second entry going into the second address of the sequence and so on until the last address in the sequence is filled. The next entry is then placed in the first address place and the sequence repeated. In this way, the journal records the order in any data stored at the L1 level is first changed. This record is then used in copying the changes made in the data at the L1 level into the other levels of the hierarchy to try to maintain a data pyramid in which the L2 level contains all the data in the L1 level and then some, the L3 level contains all the data in the L2 level and more, and so on.

The copying of data from the L1 level into the L2 level is performed whenever the data store 10b for the L2 level is free. Then the changed data can be moved from the copy back store 14a of the L1 level to the data store 10b of the L2 level while the data store 12a of the first level L1 is being occupied handling transfers of data between the memory system and PPU 20. In like manner the copying back of data on the L2 level into the L3 level is performed while the store on the L3 level is free and so on. The changes in data are copied back in order in which they were entered into the journal 16 with the oldest entry into the journal being copied back first or in other words the data which has been least recently first modified (LRFM) is copied back first when the opportunity to copy back data presents itself. In this way the copying back of data to maintain the data pyramid is made efficiently without interfering with the upward movement of the data in the hierarchy.

Besides being copied back down the hierarchy to maintain the data pyramid, modified data can be removed from any level or moved back down the hierarchy to make room for new data. Before modified data can be moved back down the hierarchy, it must be what is referred to as "top" or the top position in the data pyramid. That is, the data to be moved down cannot be at any level that is higher in the hierarchy than the level from which it is being removed. The reason for allowing only the top position in the pyramid to be rolled back or to be overlaid is to eliminate holes in the data pyramid since this simplifies the use of the journalizing and copy back techniques of the present invention. Of course unmodified data does not have to be copied back down to make room for new data. It merely has to be overlaid by the new data since a copy of unmodified data already exists at lower levels.

A "power shield" represented by the dotted line 24 is used in combination with the described journalizing and copy back techniques to insure data integrity. What is meant by a power shield is that all the equipment on one side of the dotted line 24 is run off one power supply while all the equipment on the other side of the other line is run off another power supply. Furthermore, at least in the lowest level Ln of the memory system the data is maintained on a non-volatile storage medium such as magnetic tape so that the data is immune from electrical power failures. In this bottom level Ln, the copyback store 14n contains a duplicate of all the data contained in the data store 10n so that a catastrophic loss of the data in data store 10n does not affect integrity. Therefore, failure of the power supply on either side does not destroy the integrity of data since all data is maintained at least on level Ln in a medium which is immune from such failure and all the changes made in the data on level Ln are contained on both sides of the shield 24 on at least one of the other levels L1 to Ln-1 so that it can be copied back down through hierarchy when full power is resumed. As a final precaution battery power can be employed to maintain data in the copy back stores 14, the journal 16 and journal directories 18 and to move the data down the data pyramid to a level where the data is non-volatile in case of coincident power failure on both sides of the power shield 24.

Figure 2B:
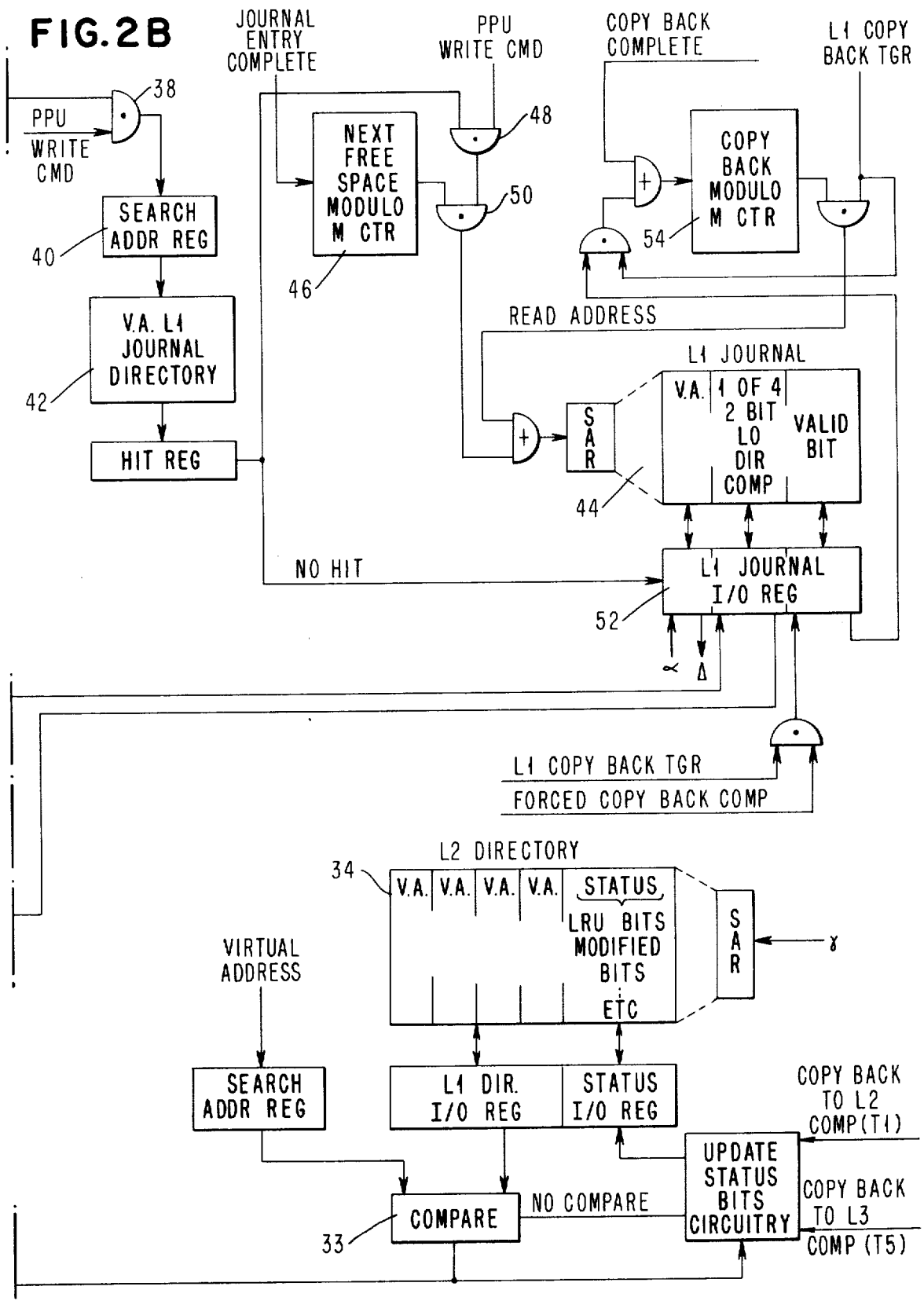
Figure 3:
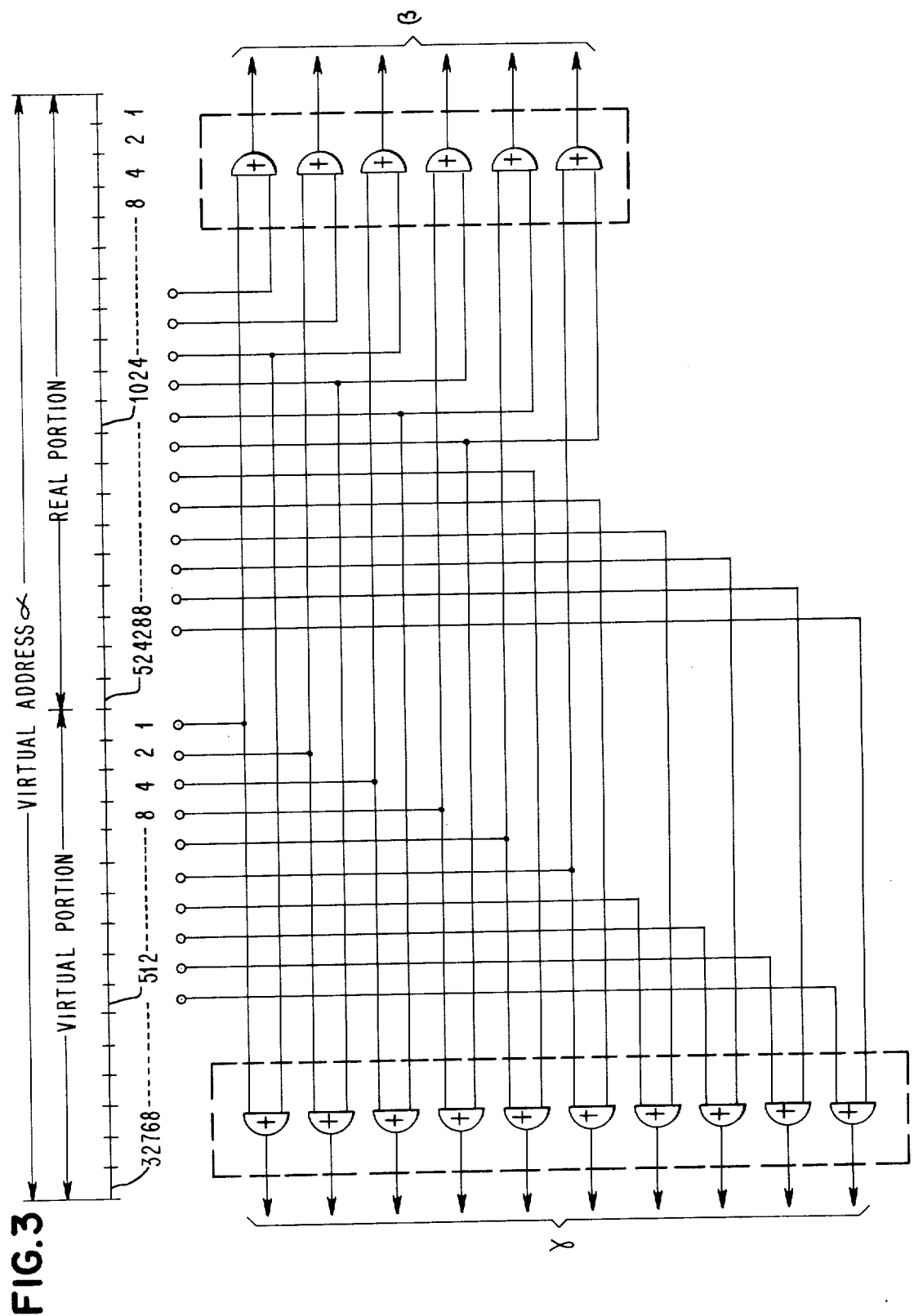
FIG. 3 is a schematic diagram of the hashing circuitry shown in block diagram form in FIG. 2.

Two-levels of the memory hierarchy system shown in FIG. 1 are shown in more detail in FIG. 2. The level L1 directory 26 stores the virtual addresses, in groups of four virtual addresses each, for all data resident in level L1 of the memory system at any given moment. The four addresses in any group are called a congruence class whose address in level L1 is determined by a hashing operation, which involves the exclusive ORing of certain of virtual address bits with real address bits in the exclusive OR circuitry 29 shown in more detail in FIG. 3. This output $\beta$ of the exclusive OR circuitry is fed to the decoder input for the directory 26 to access the directory. When the directory is so accessed, four addresses of a congruence class are read out of the directory in parallel. Each of the virtual addresses read out of the directory 26 is compared in a comparator circuit 30 with the virtual address used to generate the B accessing the L1 directory 26. If any of the addresses read out of the directory 26 matches the requested virtual address, the compare circuit provides an output signal. This output signal consists of two bits indicating which one of the four addresses read out of the directory matches the address searched. This two-bit signal is supplied to a decoder operating on the output of the first level data store 32. The data store 32 stores all the data in the first level and is addressed through its input decoder by the same hash signal $\beta$ as the directory 26, and when it is addressed reads the data at four virtual addresses in the congruence class. The one-out-of-four two-bit compare signal then selects the data of one of the virtual addresses of its congruence class to be read out into the I/O register 33 for the Data Store 32 where it is fed back to the program processing unit 28 in response to the request for data.

If it turns out that the data is not in the first level L1 then the data must be obtained from the second level L2. Like the first level L1, the second level L2 contains a directory 34. Since the second level stores more data than the first level the directory here must be larger. Thus, the input to this directory is a larger hash signal requiring more bits to select the congruence class of the four virtual addresses. This hash signal $\gamma$ is also generated by the Exclusive OR circuitry 29 shown in detail in FIG. 3. When the directory 34 is accessed by the hashed signal $\gamma$ it reads the four virtual addresses in the congruence class out into the directory register for directory 34 and into a compare circuit 33 which compares the virtual address stored with the virtual address supplied by the program processing unit 28. This results in the one-out-of-four compare selection signal indicating which one of the four addresses in the congruence class was requested. Again this selection signal is supplied to the decoder at the output of the I/O register for the second level data store 36 which has also been accessed by the hashed signal γ supplied to the directory 34. Therefore, the data at one of the locations in the congruence class is read out of the second level and supplied to the first level of the directory. Accessing of a hierarchical memory with a virtual address through a directory is well known and can be found in Application Ser. No. 298,190, filed Oct. 17, 1972, U.S. Pat. No. 3,781,808 which issued Dec. 25, 1973 to Ahern et al., the title of which is "Virtual Memory System" and is assigned to the same assignee as this application.

When data is to be written into the memory system, the PPU 28 supplies a write control signal to the gate the γ portion 38 to gate of the virtual address into the search address register 40 of the journal directory 42. The journal directory 42 is an associative memory shown in detail in FIG. 5. The search performed is an associative search comparing the virtual address with that of each of the virtual addresses stored in the journal directory. If the virtual address in the search address register matches one in the journal directory, the journal directory 42 provides a compare or hit signal indicating that the address is stored in the journal directory or, in other words, the data at that address has been previously modified. If there is a hit no entry is made into the journal or journal directory. However, if a no-compare situation exists, or in other words, no hit is scored, it indicates that the data in that address had not been previously changed. When this situation occurs an entry is made in both the journal directory 42 and the journal 44 to indicate that the address is now being modified. The position the virtual address is entered into the journal directory is not significant to the present invention since it is an associative search directory and all addresses are searched simultaneously. However, position of entry into the journal 44 is an indication of the order in which the change was made and as shall be seen later, the address in the journal determines the order in which that change is copied back into the lower levels. For this purpose a counter referred to as the next free space counter 46 counts off each of the addresses of the journal 44 in sequence. When a no-hit signal is provided by the bit register of journal directory 42 in combination with the PPU write signal, the output of the counter 46 gated through AND gates 48 and 50 into the input register to select one of the words in the journal 44. Simultaneously the virtual address is placed into the data register 52 for the journal to enter the virtual address in the journal at the location specified by the counter 46. When the journal entry is complete the counter is stepped to the next number in the addressing sequence by an entry completion signal T2. In this way each entry made in the journal is made in sequence in which the change in the data was requested by the programming processing unit 28 so that when the data is to be copied back it can be copied back in order in which the entries were made into the journal 44 by merely accessing the addresses in the journal in their numerical order.

Besides the address being entered into the journal directory 42 and the journal 44 the data for that address is entered into the data store 32 and copy back store 54. The copy back store 54 is identical to the data store 32 at that level with a one-to-one correspondence in locations in each of the stores. Therefore, say, data at location β is in the data store is to be modified, the modification will be entered into the same location β' in the copy back store. (The hatched areas in both the data store and copy back store).

Figure 4:
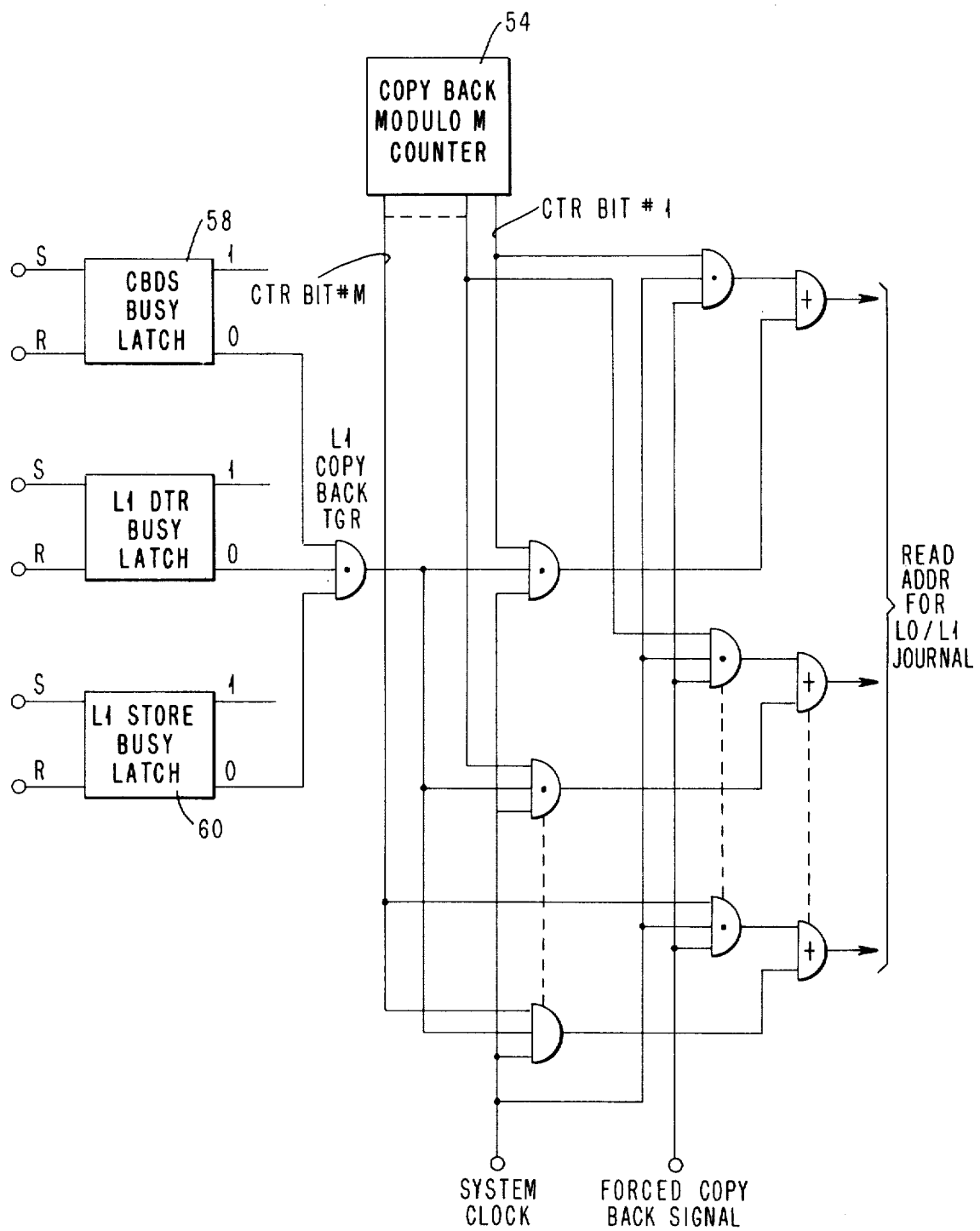
FIG. 4 is a schematic diagram of the circuitry for generating a copy back command signal for the memory system of FIG. 2.

As pointed out above, data changes are copied back in order in which they are entered into the journal 44. To accomplish this, the copy back counter 54 is triggered into operation by the circuitry of FIG. 4. It is activated when the copy back store busy latch 58 indicates that the copy back store of level L1 is not busy and when the data store latch 60 indicates that the data store for level L2 is not busy, then the output of the copy back counter 54 is applied through AND circuitry controlled by the output of the two latches 58 and 60 to the SAR of the L1 journal 44 to read out the data at the line determined by the output of the counter 54. This virtual address Δ is passed to the hashing circuitry of FIG. 3 where the β and γ inputs for the L1 copy back store 54 and the L2 data store 36 and copy back store 37 are generated and applied thereby to the input registers for the respective copy back and data store 54 as indicated in FIG. 2. After the entry has been copied back from the L1 copy back store into the L2 data and copy back stores 36 and 37 and notations of the changes in the data are duly noted in the L2 journal and L2 journal directory (not shown), a data signal T1 is applied to the copy back counter 54 to step the counter 54 to the next position. Thus, if conditions still exist for the copying back of data, the journal 44 is again accessed, addresses β and γ are generated for accessing the copy back stores and the data store, and the data at the next address is copied back into the data and copy back stores of the next level.

Figure 5:
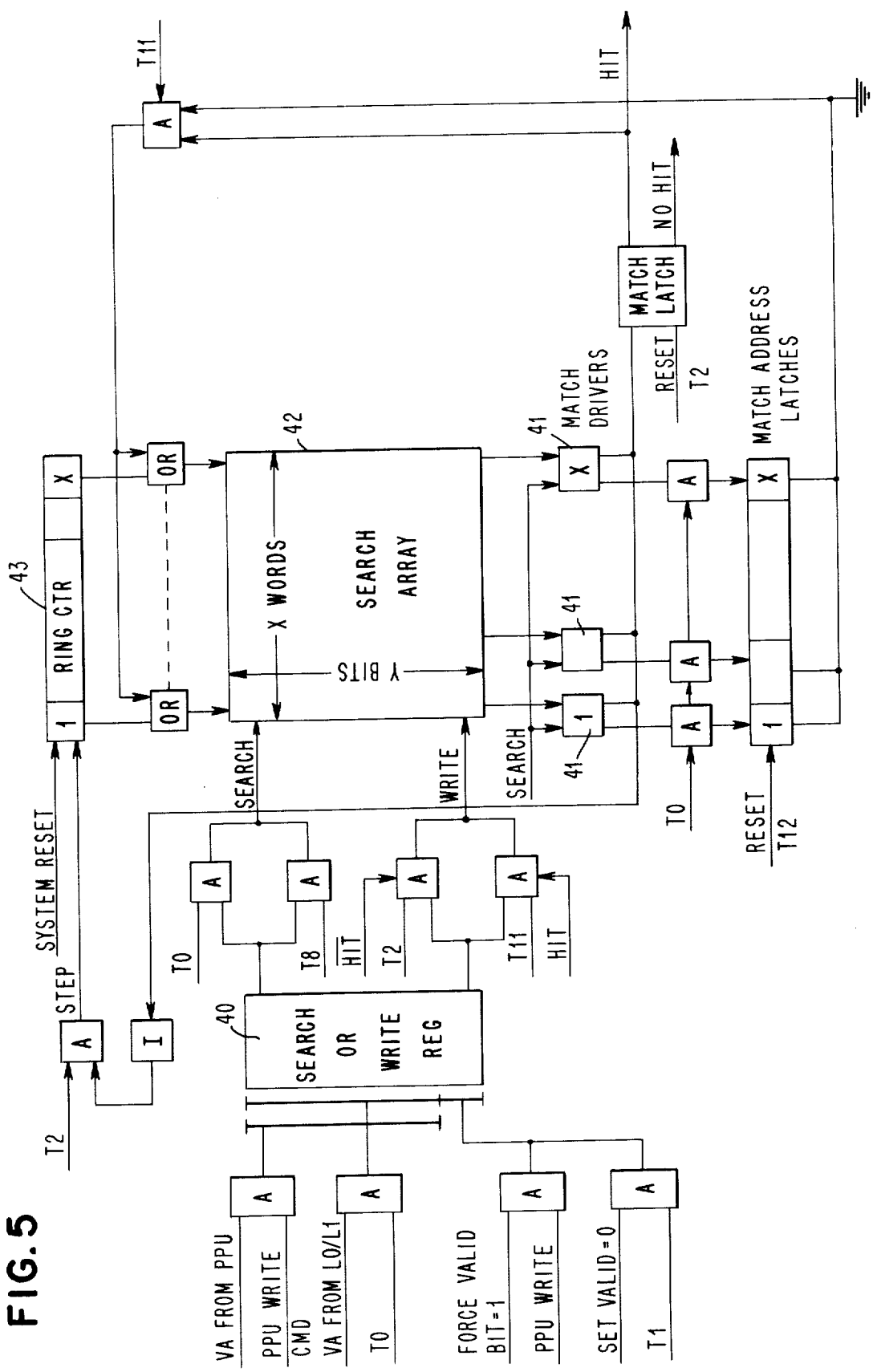
FIG. 5 is a block diagram showing details of the journal directory shown in FIG. 2; and, FIG. 6 is a schematic diagram of the circuitry for updating the status bits in the memory of FIG. 2.

Besides storing virtual address the journal 44 stores results of the one-out-of-four compare made by the comparator 30 when directory 26 is searched for the address and in addition stores what is called a valid bit. A valid bit is a bit that is turned on when entry is initially made into the journal directory and the journal. Referring to FIG. 5, it can be seen how a valid bit is entered in the search array at the journal directory 42 and how this bit is then transferred into the journal when the new entry is placed into the input/output register 52 for the journal. When the PPU 28 issues a write command to write at some virtual address, the virtual address is loaded into the search/write register 40. The length of the search/write register is 1 bit greater than the virtual address and when the virtual address is entered, the last or the Yth position in the search register is forced to a logical 1. As pointed out previously the entire search array 42 is interrogated simultaneously. If the contents of the search/write register 40 matches bit for bit with one of the array words, one and only one of the array match drivers 41 will be turned on. Any one of the match drivers being turned on will provide a hit signal which signifies that the data had been changed previously and an entry has already been made in the journal and journal directory.

When none of the match drivers is turned on a no-hit condition is indicated. This means that an entry must be made in the journal directory 42 and the journal 44. For this purpose a ring counter 43 is advanced to address the next available word in the search array 42. At the same time, the write gate is conditioned such that the contents of the search/write Registers are written into the location addressed by the ring counter.

Finally, when data is copied back the journal must reflect this change in the situation. Therefore, when this copy back is complete the journal directory must reflect the fact that the page in L1 data store 32 no longer differs from the copy in L2 data store 36. This is done in the following manner. The virtual address fetched from the L1 journal 44 at copy back time, is used to search the L1 journal directory 44. The hit address in the search array is set into the match address latches and the valid bit in the search/write register is set to invalid or logical zero. On the write portion of the cycle, the match address latches are used to address the search array.

The contents of the search/write register are written into the location addressed. The valid bit being turned off will prevent a compare on a virtual address search of the array the next time the array is searched. When the match address register is reset. The timing signals T shown in this and other figures of the specifications are signals generated by conventional clocking circuitry in the order of the number associated with the signal.

Two types of copy back are possible, copy back in accordance with the LRFM algorithm as described previously and a forced copy back. A forced copy back is a copy back that does not occur in the order of the least recently first modified copy back algorithm. That is the algorithm set up by the stepping of the journal 44 through its adresses in sequence by the copy back counter 54. When a forced copy back takes place, valid bit is removed from the journal and from the journal and from the journal directory just as it is during a regular copy back operation to indicate to the copy back mechanism that the data has been already copied back and should not be repeated.

Figure 6:
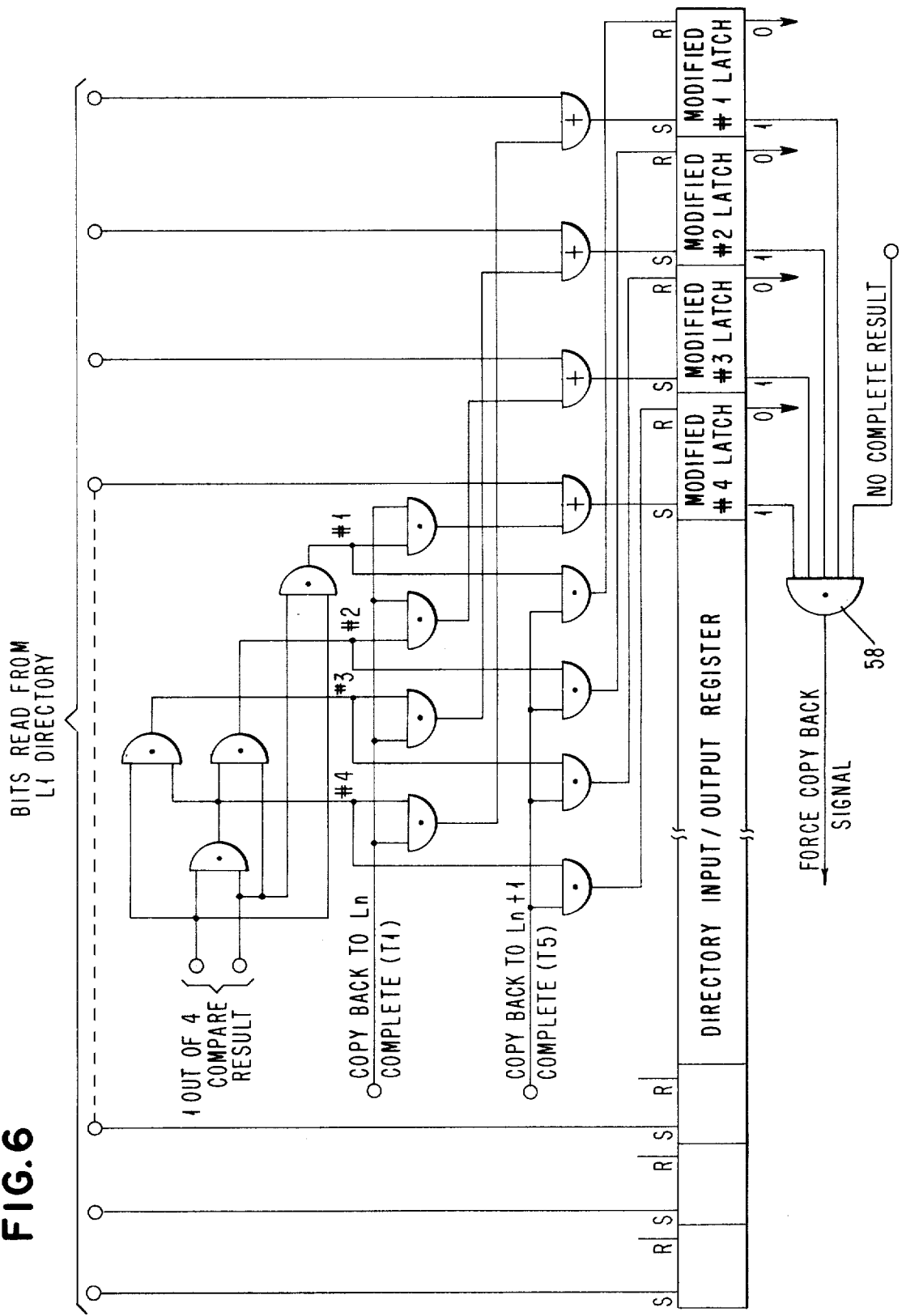

A forced copy back takes place when data is to be entered into a congruence class in which data at all the virtual addresses in the congruence class have been changed and the changes have not yet been copied back. To determine whether a forced copy back must be performed, the directory 26 contains four status bits, a status bit for each individual address is in the congruence class. The status bits are set by the status bit update circuitry 56 shown in detail in FIG. 6. Whenever data is either changed or copied back this circuitry changes the status bits to reflect the fact. The status bit circuitry also contains an AND circuit 58. When the output in the directory contains four ones indicating that data at all addresses in a particular congruence class has been changed and there is a no-compare signal indicating that the data is not stored anywhere at the level of the level, a forced copy back signal is generated by this AND circuit 58.

From the description of preferred embodiments of this invention, those skilled in the art will recognize a variety of applications for the invention and appropriate modifications within the scope of the claims.

What is claimed is:

1. In a multi-level hierarchical memory system made up of a lowest level with a first data store means for storing the data base of the memory system and a plurality of sequentially higher levels each level having a different first data store means for storing at that level a portion of the data contained in the first data store means at the next lower level in the hierarchy and also changes of addition or modification to units of said data made by computer instruction from a processing unit to be copied back to said next lower level because said changes are not contained in the first data store means in the next lower level, an improvement in the means of copying back from any given level of the sequentially higher levels into the next lower level said changes at said given level comprising:

a second data store means at said any given level that is coupled to the processing unit for storing a duplicate copy of only those units of the data at said any given level that contain said changes to be copied back down to lower levels;

a journal means coupled to the processing unit for recording the locations of data at the given level in the order in which data units stored in the second data store means at said given level were first altered at that given level by one of said changes that has not been copied back into any lower level; and, copyback means coupled to the next lower level and to the journal means for copying back the changes made in the data at that given level into the next lower level in the hierarchy in said order recorded in the journal means whereby a change in data made at the given level is reflected in the data at the lower levels of the hierarchy.

2. The hierarchical memory system of claim 1 including two different power means, one coupled to the first data store means for supplying power to the first data store means at the given level and the other coupled to the second data store means for supplying power to the second data store means at the given level to prevent the loss of data in both the data store and the second data store on failure of one of the power means.

3. The hierarchical memory system of claim 1 wherein
said journaling means includes means to record when said data has been copied back, and,
said copy back means includes independent means for copying back changes in units of data in the order in which the units of data at the given level first received a change that has not been copied back.

4. The hierarchical memory system of claim 3 wherein said copy back means includes means to read data out of the second data store of a given level into the first data store of the next lower level.

5. In a multi-level hierarchical memory system having a lowest level with a first data store means for storing the data base of the memory system and a plurality of sequentially higher levels each sequentially higher level having a different first data store means with a plurality of storage locations for storing at that level a portion of the data contained in the first data store means at the next lower level in the hierarchy, an improvement in the means of copying changes made either by addition or modification in data stored at any given level of said sequentially higher levels of the hierarchy back down the hierarchy into a level lower than said given level comprising:

a second data store means at each given level of the sequentially higher levels of the hierarchy for storing a duplicate copy of only that portion of said data in which changes were made at that given level and not reproduced at lower levels in the hierarchy, means at each given level of the sequentially higher levels for transmitting the changes stored in second data store means at that given level to a lower level in the hierarchy, a second data store means at the lowest level in the hierarchy for storing a duplicate of all the data contained in the first data store means of the lowest level, and, two separate power means the first power means being coupled to the first data store means of each level for supplying power thereto and the second power means being coupled to the second data store means at each level for supplying power to the second data store means whereby loss of one of the two separate power means does not result in the loss of the data or any of the changes made therein.

6. The hierarchical memory system of claim 5 wherein:
the first data store and the second data store at each of the given levels is a volatile store, and,
the first data store and the second data store at the lowest level are non-volatile data stores.

* * * * *